United States Patent

Shu-Fen

[11] Patent Number: 6,006,555
[45] Date of Patent: Dec. 28, 1999

[54] STEEL CABLE LOCK

[76] Inventor: Chung Shu-Fen, No. 73, Tsao Kang Lane, Tsao Chung Li, Lu Kang Township, Chang Hua Hsien, Taiwan

[21] Appl. No.: 09/237,308

[22] Filed: Jan. 26, 1999

[51] Int. Cl.⁶ .................................................. E05B 73/00
[52] U.S. Cl. ...................................... 70/18; 70/49; 70/58
[58] Field of Search ................................. 70/14, 18, 30, 70/49, 58

[56] References Cited

U.S. PATENT DOCUMENTS

| | | | |
|---|---|---|---|
| 1,534,936 | 4/1925 | Fischbach | 70/18 |
| 4,325,238 | 4/1982 | Scherbing | 70/18 |
| 4,819,464 | 4/1989 | Kuo | 70/18 |
| 4,850,207 | 7/1989 | Ylven | 70/49 |
| 4,938,040 | 7/1990 | Humphreys, Jr. | 70/14 X |
| 5,035,126 | 7/1991 | Biba | 70/18 |
| 5,119,649 | 6/1992 | Spence | 70/14 |
| 5,291,765 | 3/1994 | Hoisington | 70/18 X |
| 5,568,740 | 10/1996 | Lin | 70/18 X |
| 5,706,679 | 1/1998 | Zane et al. | 70/18 |
| 5,752,416 | 5/1998 | Nien | 70/18 X |
| 5,761,934 | 6/1998 | Kuo | 70/49 |
| 5,794,463 | 8/1998 | McDaid | 70/18 |

*Primary Examiner*—Lloyd A. Gall
*Attorney, Agent, or Firm*—Harrison & Egbert

[57] ABSTRACT

An improved steel cable lock includes of a steel cable, a lock body provided with a lock hole at one side thereof, and a buckle rod provided with an embed rod at one end thereof. The feature of the improved steel cable lock has one end of steel is circled with split ring which is fastened by a steel cable piece. The rod body of buckle rod is run through a hole at the both sides. In addition, at the top end of rod body is protruded with two relative interval fix pieces. Between the two fix pieces have an embed trough providing the rear end of embed rod to insert in then pivoting with the bolt. Another end of the steel cable extends through the hole in the buckle rod and is received by a sheath tube affixed to the lock body. Thus, the lock body and buckle rod can revolve on the steel cable and the buckle rod can move adjustable between the both ends of steel cable, the embed rod of buckle rod can revolve also.

3 Claims, 7 Drawing Sheets

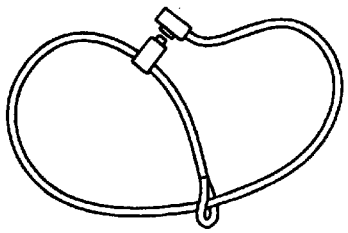
FIG.9A
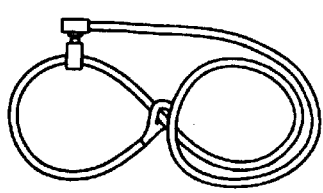
FIG.9B
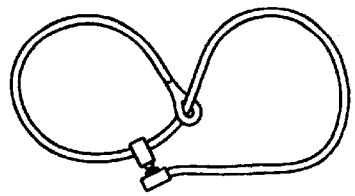
FIG.9C
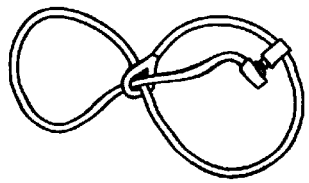
FIG.9D
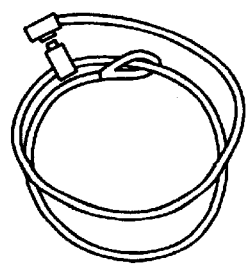
FIG.9E
FIG.9F
FIG.9G
FIG.9H
FIG.9I
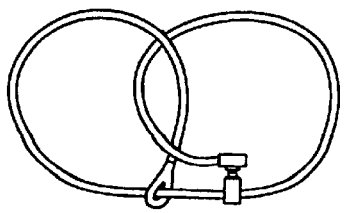
FIG.9J

STEEL CABLE LOCK

FIELD OF THE INVENTION

The present invention relates generally to a steel cable lock, and more particularly to an improved steel cable lock device.

BACKGROUND OF THE INVENTION

As shown in FIG. 1, the conventional steel cable lock is comprised of a steel cable 10 which connected with a buckle rod 11 and a lock body 12 at both ends thereof. Since the steel cable lock only extends between the buckle rod 11 and the lock body 12, it is therefore just able to lock around the goods that are being locked. Such in design is not able to be properly locked and is limited by the type, model, distance and space of the goods. In addition, after the steel cable 10 is put around on the locked goods, the buckle rod 11 and the lock body 12 will move so that the buckle rod 11 can not insert into lock body 12. Then the user will have to twist the steel cable 10 or force the buckle rod 11 and the lock body 12 to lock together.

SUMMARY OF THE INVENTION

The primary objective of the present invention is therefore to provide an improved steel lock wherein the steel cable is circled by a split ring at one end thereof and pivoted with buckle rod at another end thereof. In addition, the lock body is connected pivotally with a sheath tube and the rod body of buckle rod pivotally with an embed rod. The steel cable lock takes advantage of the rotatable and movable adjustabiily of the lock body, the buckle rod, the embed rod, and further takes the advantage of using the sheath split ring such that the present invention is suitable to use over a wide area or object and is convenient.

The objective, features and functions of the present invention will be readily understood upon a thoughtful deliberation of the following detailed description of the present invention with reference to the accompanying drawings.

BRIEF DESCRIPTION OF THE DRAWINGS

FIGS. 9A through 9J show a schematic plan view of the present invention in various locking fashions.

DETAILED DESCRIPTION OF THE INVENTION

Figure 1:
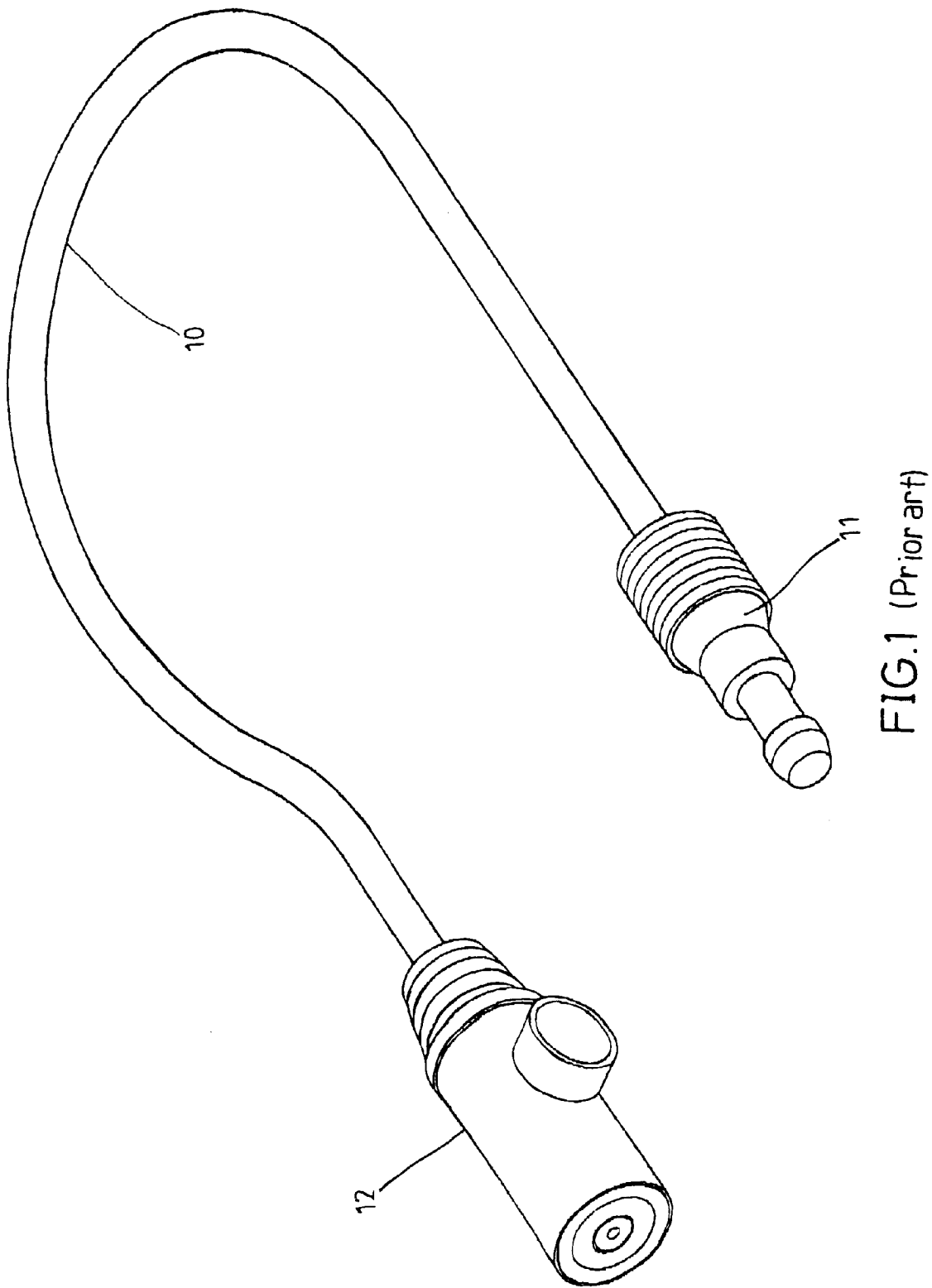
FIG. 1 shows a perspective view of the prior art steel cable lock in combination.
Figure 2:
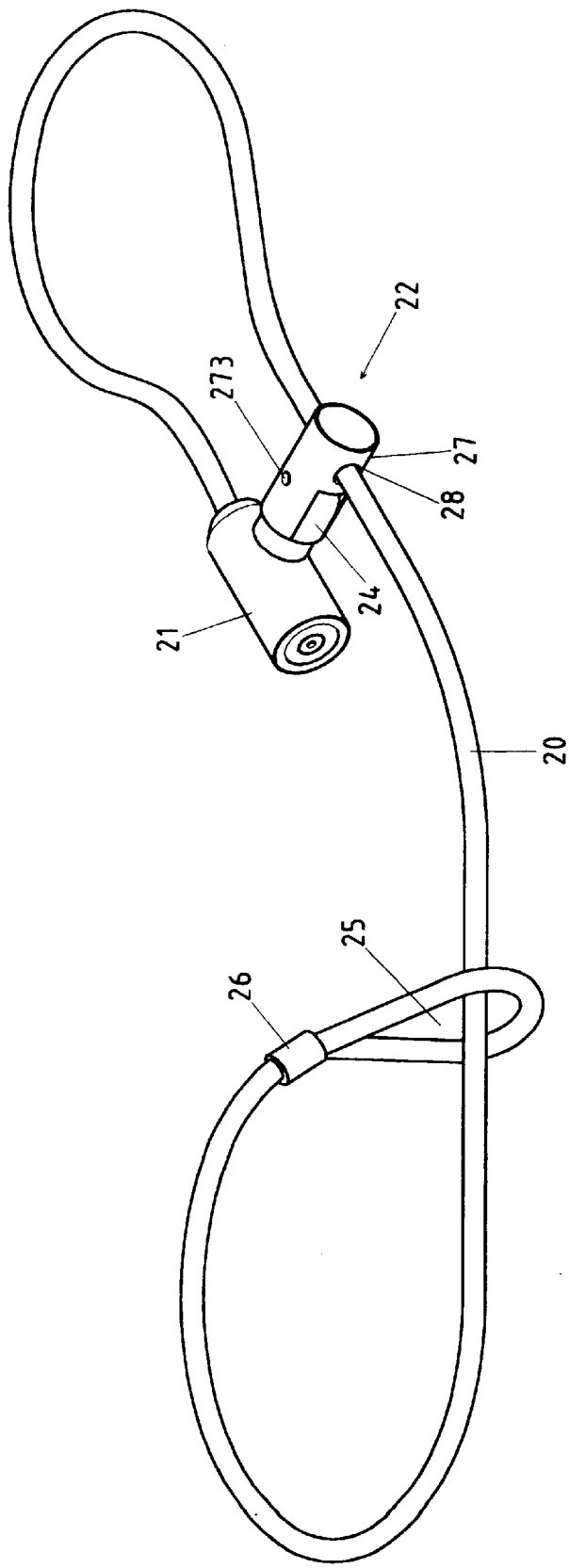
FIG. 2 shows a perspective view of the present invention in combination.
Figure 3:
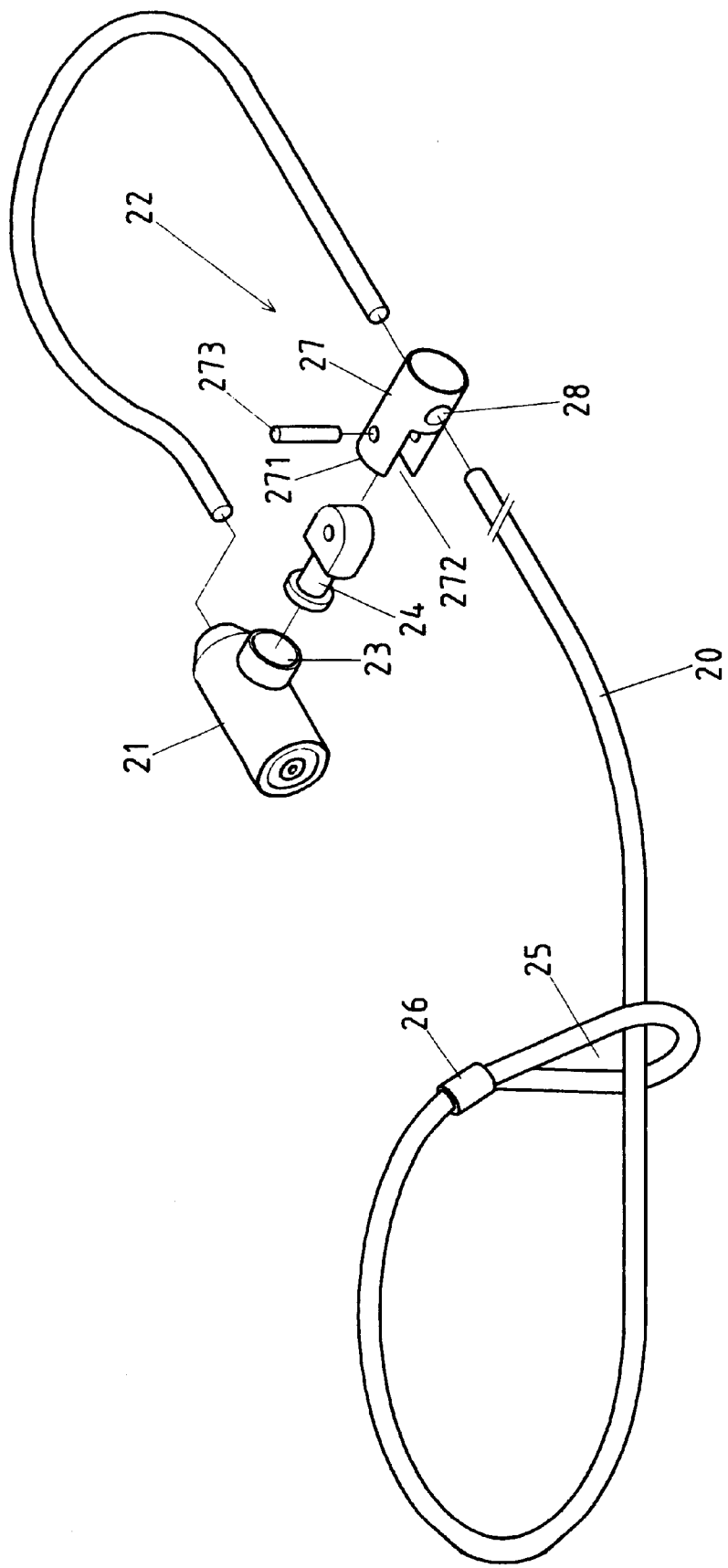
FIG. 3 shows an exploded view of the present invention.

As shown in FIGS. 2 and 3, an improved steel cable lock of the present invention is comprised of a steel cable 20, a lock body 21, and a buckle rod 22. At one side of the lock body 21 is provided with a lock hole 23, and at one end of the buckle rod 22 is provided with an embed rod 24.

The feature of the present invention has one end of steel cable 20 circled by split ring 25, which is fastened by a steel piece 26. The rod body 27 of buckle rod 22 is run through a hole 28 at both sides. In addition, at the top end of rod body 27 is protruded with two relative interval fix pieces 271. Between the two fix pieces 271 have an embed trough 272 providing the rear end of embed rod 24 to insert in, then pivoting with the bolt 273. The other end of steel cable 20 runs through the hole 28 of buckle rod 22 and is pivoted with the lock body 21 by a sheath tube 40. Thus, the lock body 21 and buckle rod 22 can revolve on the steel cable 20, and the buckle rod 22 can move adjustably between the both ends of steel cable 20, then the embed rod 24 of buckle rod 22 can revolve also. Such construction of the above elements provides the adjustment for various changes of locking way, provides in wide range of use, and provides convenience in use.

Figure 4:
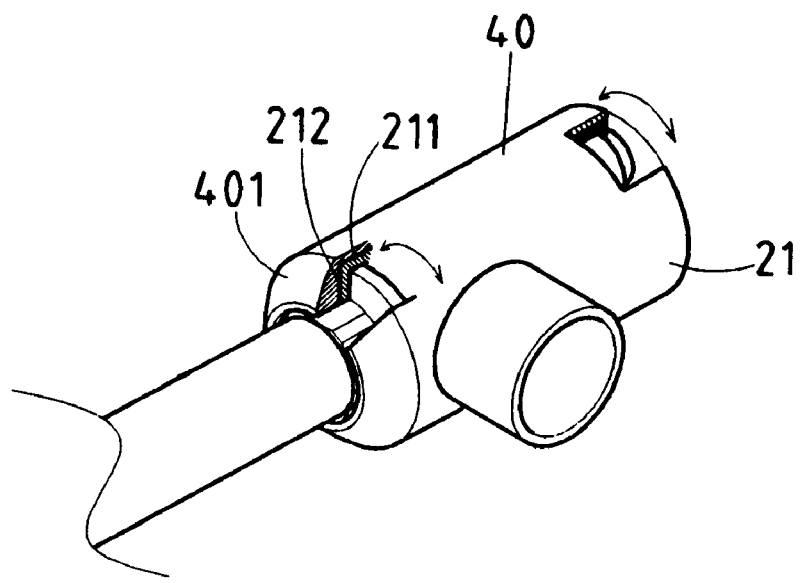
FIG. 4 shows a sectional part view of a lock body and a steel cable of the present invention in combination.
Figure 5:
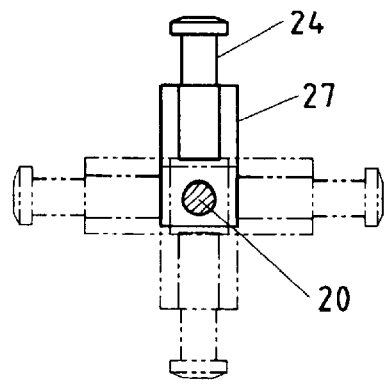
FIG. 5 shows a schematic view of a buckle rod and the steel cable of tire sent invention in revolve adjusting.
Figure 6:
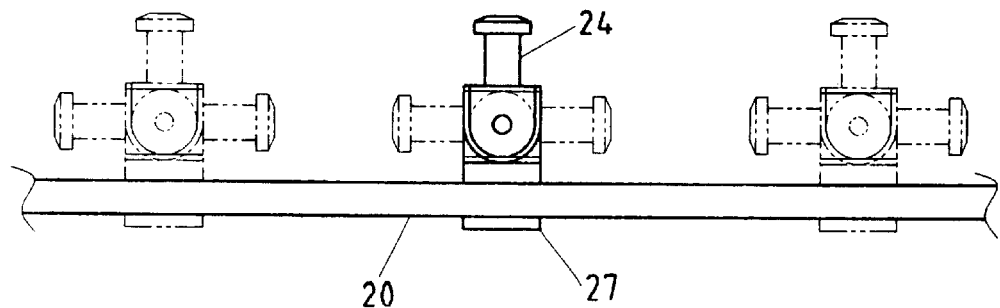
FIG. 6 shows a schematic view of the buckle rod and the steel cable of the present invention in move adjusting.
Figure 7:
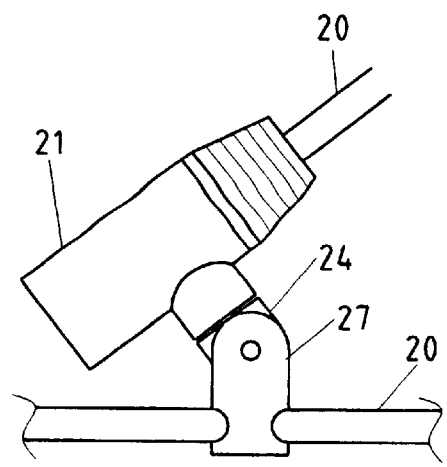
FIG. 7 shows a schematic plan view of the buckle rod and the body of the present invention in locking.

As shown in FIG. 4, the sheath tube 40 includes a lock implement 211 of lock body 21, so that one end of sheath tube 40 forms a large outer diameter convex ring edge 401 which is blocked by an inner wall ring edge 212 of one end lock implement 211, Therefore the lock body 21 takes the advantage of sheath tube 40 being able to revolve.

Figure 8:
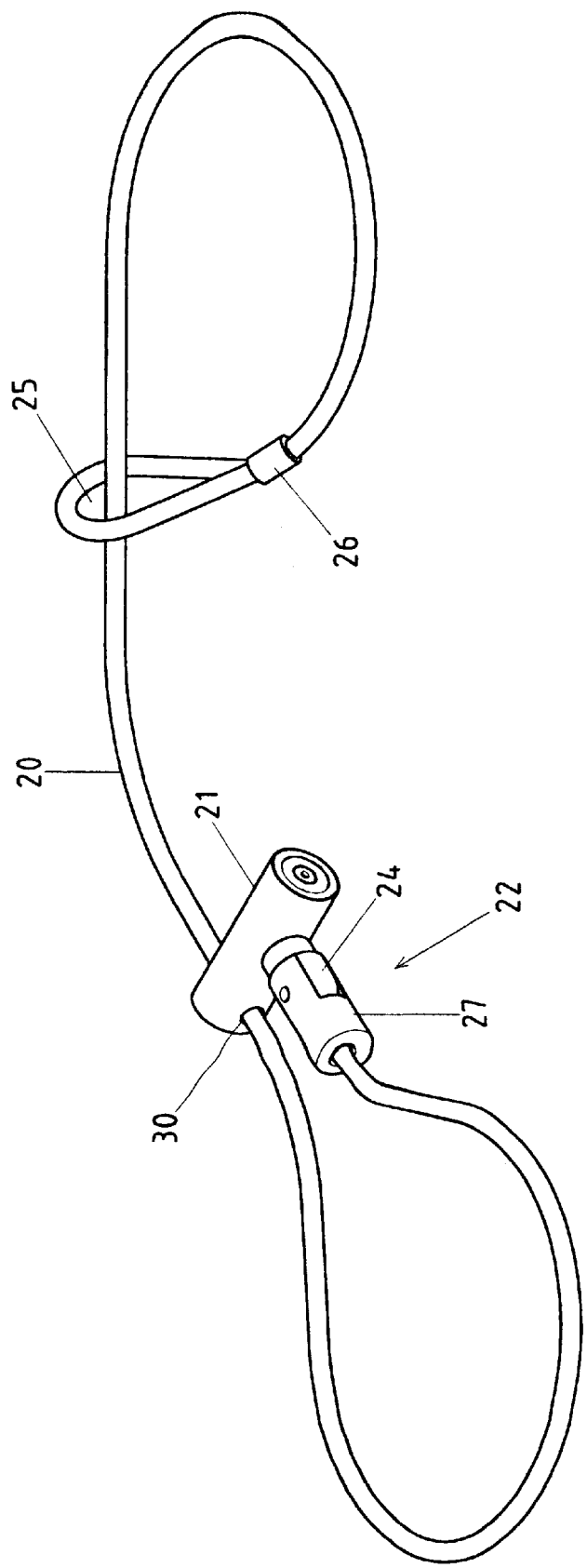
FIG. 8 shows another perspective view of the present invention in combination.

As shown in FIG. 8, both sides of lock body 21 are run through also with a through hole 30 providing one end of steel cable 20 to go across the through hole 30 of lock body 21, then fasten firmly with buckle rod 22, so as to enable the lock body 21 to revolve on the steel cable 20 or move adjustably between both ends of steel cable 20.

The present invention has advantages over the prior art. Such advantages are described hereinafter.

As illustrated in FIGS. 3–6, the steel cable 20 can extend around an object by looping the lock body 21 (together with the buckle rod 22) through the split ring 25 and then fastening the lock body 21 onto the buckle rod 22. Alternately, the lock body 21 and the remainder of the steel cable 20 can encircle the to-be-locked goods and then the lock body 21 can engage with the buckle rod 22. Because of the ability of the buckle rod 22 to slide along the steel cable 20 or to rotate with respect to the steel cable 20, the locking connection between the lock body 21 and the buckle rod 22 can be established in a wide variety of arrangements (as shown in FIGS. 9A through 9J). Since the rod body 27 of buckle rod 22 is pivotally connected to the embed rod 24, the embed rod 24 has a 180° range of motion. The buckle rod 22 can lock in various ways with the lock body 21. When the steel cable 20 encircles an object, the buckle rod 22 and the lock body 21 can change position or revolve about the steel cable 20 or revolve with respect to each other or swing because of the action of the embed rod 24. As shown in FIGS. 9A through 9J, the present invention is capable of a variety of locking connections.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended claims.

I claim:

1. A steel cable lock apparatus comprising:
   a steel cable;
   a lock body having a lock hole formed on one side thereof;
   a buckle rod comprising a rod body with an embed rod affixed at one end thereof, said rod body having a hole extending therethrough so as to open at both sides thereof, said one end of said rod body having two relative interval fix pieces extending outwardly therefrom, said rod body having an embed trough formed between said two relative interval fix pieces, said embed trough receiving an end of said embed rod therein, said end of said embed rod pivotally mounted by a bolt within said embed trough, said hole extending through said two relative interval fix pieces and said embed rod, said steel cable extending through said hole of said rod body, said steel cable having one end rotatably received by a sheath tube affixed to said lock body, said buckle rod being rotatable around said steel cable, said buckle rod being slidable along said steel cable, said embed rod being pivotally connected to said lock body; and a split ring affixed to one end of said steel cable by a steel piece, said split ring encircling said steel cable.

2. The apparatus of claim 1, said sheath tube extending over a lock implement of said lock body, one end of said sheath tube forming an outer convex ring edge, said outer convex ring edge abutting an inner wall ring edge at one end of said lock implement.

3. The apparatus of claim 1, said lock body having a hole extending therethrough, said steel cable extending through said hole of said lock body.

* * * * *